J. A. LE ROY.
KINETOSCOPE.
APPLICATION FILED JULY 29, 1911.
1,075,215.
Patented Oct. 7, 1913.
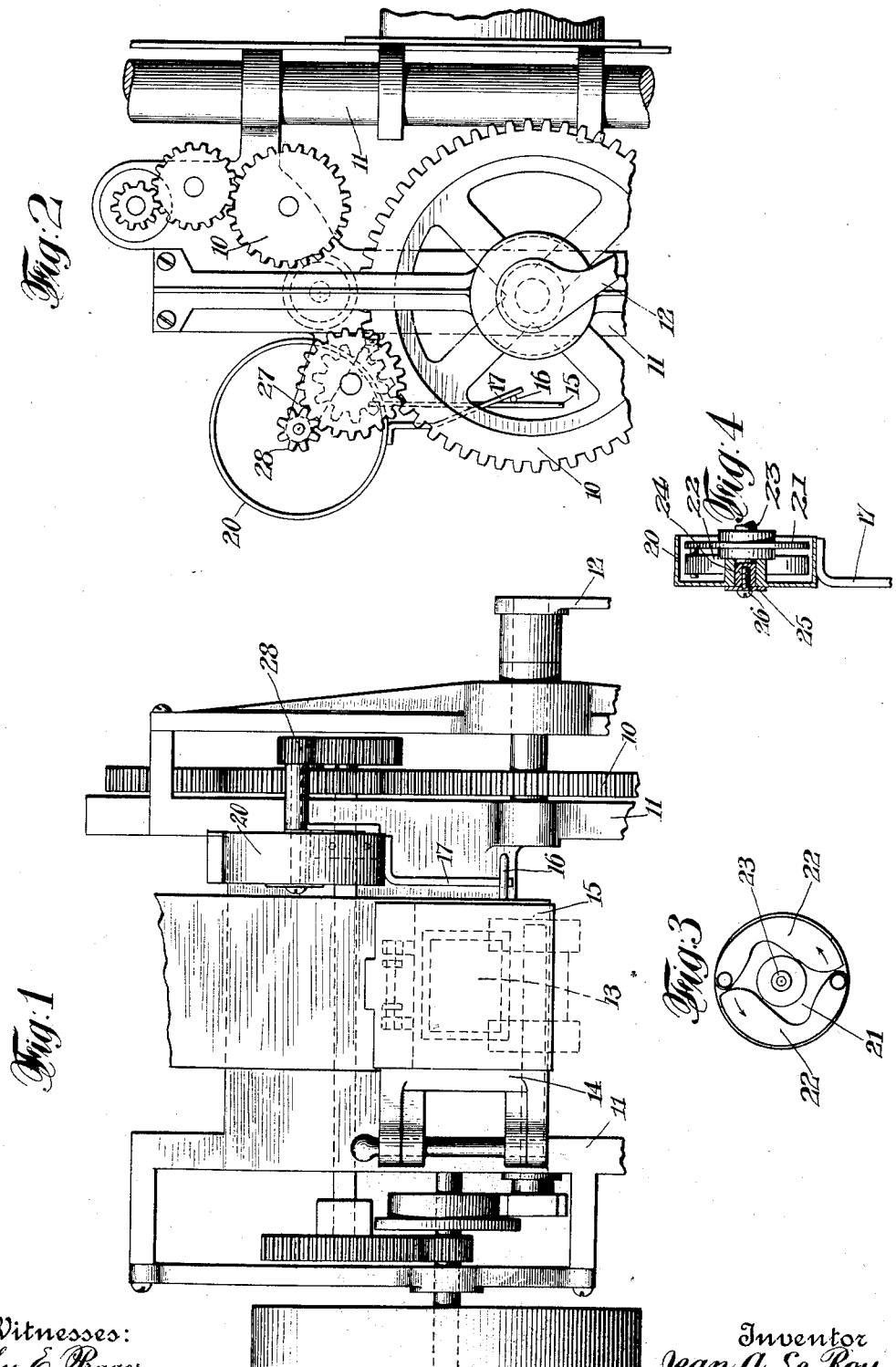
Witnesses:
John E. Prager
A. Worden Gibbs
Inventor
Jean A. Le Roy
By his Attorney

UNITED STATES PATENT OFFICE.

JEAN A. LE ROY, OF NEW YORK, N. Y.

KINETOSCOPE.

1,075,215.   Specification of Letters Patent.   Patented Oct. 7, 1913.

Original application filed March 12, 1908, Serial No. 420,623. Divided and this application filed July 29, 1911. Serial No. 641,230.

*To all whom it may concern:*

Be it known that I, JEAN A. LE ROY, a citizen of the United States, and a resident of New York, in the county of New York and State of New York, have invented certain new and useful Improvements in Kinetoscopes, of which the following is a specification.

The invention relates to kinetoscope apparatus, and more particularly to protecting means for preventing the firing of the highly inflammable film employed in such apparatus when the operating mechanism slows down or stops entirely.

To this end the invention consists in providing a protective shutter which is automatically controlled from the said operating mechanism of the kinetoscope.

The present invention is a division of an application filed by me on the 12th day of March 1908 and bearing the Serial No. 420,623 and upon which a patent was granted, bearing date the 21st day of May, 1912 and numbered 1,027,135, and wherein the said invention is shown and described but not specifically claimed.

The nature of my invention will be best understood when described in connection with the accompanying drawing, in which—

Figure 1 is a fragmentary rear elevation, and Fig. 2 a fragmentary side elevation of a kinetoscope with my protective apparatus attached. Figs. 3 and 4 are detail views illustrating the centrifugal mechanism employed in connection with the protective shutter to operate the same.

Similar characters of reference designate corresponding parts throughout the several views.

Referring now to the drawings, 10 designates suitable gearing mounted in a kinetoscope frame 11 and operated through a handle 12 to actuate, in well-known manner, film moving mechanism to cause the kinetoscope film to pass before an aperture 13 in the gate 14 of said kinetoscope. To this gate is hingedly connected a shutter 15 provided with a laterally extending arm or lever 16. This arm is arranged to be engaged by a depending arm 17 when the film moving mechanism is in motion to move upwardly the arm 16 and thereby raise the said shutter 15 to permit the projected light to pass through the aforesaid aperture 13 and through the film. So soon, however, as the speed of the film moving mechanism falls below the normal rate, or stops entirely, the said arm 17 is caused to drop back into its normal vertical position. The shutter 15 under the action of gravity follows the said arm 17 and thereby shuts off the intense light, which, if permitted to pass through the aperture 13 to the slowly moving or stationary film, would in a few seconds cause the ignition of the same. To effect this control of the shutter by means of arms 16 and 17, the latter arm is connected in suitable manner to a shell 20 within which is arranged suitable centrifugal mechanism operated through the gearing 10. This mechanism is designed to partly rotate said shell 20 and to thereby raise the shutter when the proper speed is attained by said mechanism. The centrifugal mechanism is shown to consist of a disk 21 upon which are pivotally mounted, and near the circumference thereof, a plurality of centrifugal members or arms 22. The said disk is provided with a shaft 23 which fits in a bearing 24 of the shell 20, the shell remaining free to oscillate about the disk but held against separation therefrom by means of a washer 25 and screw 26 screwed into the said shaft 23. The shaft 23 is mounted within suitable bearings of a bracket or fixture 27 secured to the frame 10. The shaft is driven through a gear wheel 28, mounted thereon, by the gearing 10 which is arranged to engage therewith. As the handle 12 is turned, rotation is thus communicated to the disk 21 causing its centrifugal members 22 to fly outwardly and proportionally to the speed of rotation; and, when the proper speed is attained, sufficient frictional contact is thereby provided with the inner surface of shell 20 to partly rotate the same and lift the shutter as explained.

The two parts of the protecting device hereinbefore described, namely—the shutter and the centrifugal mechanism, though arranged to act in conjunction, are entirely separate and are independently attached, the former being an integral part of the gate and the latter of the film moving mechanism. Relative vertical movement of the film moving mechanism, as in framing the pictures of the film, will therefore not disturb the action of the shutter mechanism.

The two parts may, also, be readily adapted to existing machines of this nature as no alteration or change of parts of the same is required. It is merely necessary to add the same thereto by suitable intergearing with the film moving mechanism. I do not wish to restrict myself, however, to the particular arrangement or construction of the centrifugal mechanism, as it is evident that various modifications therein may be made without departing from the spirit of my invention.

I claim:—

1. In a motion picture projecting machine having a light aperture: a shutter movably mounted in front of the aperture; a rotatable shaft; centrifugal members carried by said shaft; a shell adapted to oscillate upon said shaft and mounted about said centrifugal members to be engaged thereby; and engaging means connected to said shell and disconnected from said shutter but adapted to engage the same.

2. In a motion picture projecting machine having a light aperture: a shutter movably mounted in front of the aperture; a rotatable shaft, and a disk mounted thereon; centrifugal pieces pivotally connected to said disk; a shell adapted to oscillate upon said shaft and mounted about said centrifugal pieces to be engaged thereby; and an arm connected to said shell and disconnected from said shutter but adapted to engage the same.

3. In a motion picture projecting machine having a light aperture: a shutter movably mounted in front of the aperture; a rotatable shaft, and a disk mounted thereon; centrifugal pieces pivotally mounted on said disk and near the circumference thereof; a shell adapted to oscillate upon said shaft and mounted about one end of same and about the said centrifugal pieces to be engaged thereby and providing a bearing for the end of said shaft; means to hold said shell on said shaft; and an arm connected to said shell and disconnected from said shutter but adapted to engage the same.

4. In a motion picture projecting machine having a light aperture: a shutter movably mounted in front of the aperture; a rotatable shaft; frictional engaging means carried by said shaft; a shell adapted to oscillate upon said shaft and mounted about said frictional means to be engaged thereby; an arm extending laterally from said shutter; and an arm depending from said shell adapted to engage the said laterally extending arm only when the shell is oscillated in a predetermined direction.

5. In a motion picture projecting machine having a light aperture: a shutter movably mounted in front of the aperture, and an arm extending laterally therefrom; centrifugal mechanism for moving the shutter to permit the light to pass through the aperture, including a rotatable shaft and a disk mounted thereon, centrifugal pieces pivotally mounted on said disk and near the circumference thereof, a shell adapted to oscillate upon the said shaft and mounted about one end of the same and about the centrifugal pieces to be engaged thereby; a collar extending inwardly from said shell and fitting over the end of said shaft; a washer, and a screw passing therethrough into the end of said shaft to hold the shell in place upon the same; an arm depending from said shell adapted to engage the said laterally extending arm of the said shutter only when the shell is moved in a predetermined direction; and means carried by said shaft and engaging the operating mechanism of the kinetoscope.

Signed at New York, in the county of New York, and State of New York this 17th day of July A. D. 1911.

JEAN A. LE ROY.

Witnesses
  A.     ASH,
      COBIN.

Copies of this patent may be obtained for five cents each, by addressing the "Commissioner of Patents, Washington, D. C."